United States Patent
Ferro et al.

(10) Patent No.: US 8,027,758 B2
(45) Date of Patent: Sep. 27, 2011

(54) NAVIGATION SYSTEM FOR AN AIRCRAFT AND ASSOCIATED COMMAND PROCESS

(75) Inventors: Daniel Ferro, Muret (FR); Machiel Van Boven, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 697 days.

(21) Appl. No.: 11/334,538

(22) Filed: Jan. 19, 2006

(65) Prior Publication Data

US 2006/0265110 A1    Nov. 23, 2006

Related U.S. Application Data

(60) Provisional application No. 60/714,341, filed on Sep. 7, 2005, provisional application No. 60/645,050, filed on Jan. 21, 2005, provisional application No. 60/644,533, filed on Jan. 19, 2005.

(30) Foreign Application Priority Data

Aug. 1, 2005 (FR) ..................................... 05 08212

(51) Int. Cl.
    *G05D 1/04* (2006.01)
    *G01C 23/00* (2006.01)

(52) U.S. Cl. ............ 701/18; 701/16; 701/206; 244/183; 340/973

(58) Field of Classification Search ................ 701/3, 14, 701/16, 18; 340/945, 973; 244/182, 183
See application file for complete search history.

(56) References Cited

U.S. PATENT DOCUMENTS

| | | | |
|---|---|---|---|
| 3,589,648 A | | 6/1971 | Gorham et al. |
| 3,666,929 A | * | 5/1972 | Menn ............................... 701/16 |
| 3,670,149 A | * | 6/1972 | Parkman et al. ................ 701/16 |
| 3,690,598 A | | 9/1972 | Buchholz et al. |
| 3,752,967 A | * | 8/1973 | Vietor ............................. 701/15 |
| 3,786,505 A | * | 1/1974 | Rennie ............................ 342/33 |
| 3,868,497 A | * | 2/1975 | Vietor ........................... 701/121 |
| 4,042,197 A | | 8/1977 | Boyle et al. |
| 4,232,839 A | * | 11/1980 | Sicre et al. .................... 244/188 |
| 4,633,404 A | * | 12/1986 | Greeson et al. .................. 701/3 |

(Continued)

FOREIGN PATENT DOCUMENTS

EP          1 460 385 A1      9/2004

(Continued)

OTHER PUBLICATIONS

Anthony Warren, et al. "Development of Continous Descent Approach Concepts for Noise Abatement," Digital Avionics Systems Conference, in Irvine, Oct. 27-31, 2002, pp. 1-11.

*Primary Examiner* — Mark Hellner
*Assistant Examiner* — Ari M Diacou
(74) *Attorney, Agent, or Firm* — Oblon, Spivak, McClelland, Maier & Neustadt, L.L.P.

(57) ABSTRACT

A navigation system for an aircraft, including a calculator of an estimated flight path for the aircraft; a device for determining an estimated value of a flight parameter that corresponds to an estimated speed for the extension of at least a portion of the high-lift devices of the aircraft; and a display of an indication for such estimated value. A command process for such a system and an aircraft equipped with such a system are also disclosed.

35 Claims, 5 Drawing Sheets

U.S. PATENT DOCUMENTS

| | | | | |
|---|---|---|---|---|
| 4,792,906 A | * | 12/1988 | King et al. | 701/5 |
| 4,825,374 A | * | 4/1989 | King et al. | 701/5 |
| 4,924,401 A | * | 5/1990 | Bice et al. | 701/6 |
| 5,020,747 A | * | 6/1991 | Orgun et al. | 244/187 |
| 5,406,487 A | * | 4/1995 | Tanis | 701/16 |
| 5,445,021 A | * | 8/1995 | Cattoen et al. | 73/178 R |
| 6,154,693 A | * | 11/2000 | Aberschitz et al. | 701/16 |
| 6,163,744 A | * | 12/2000 | Onken et al. | 701/3 |
| 6,450,456 B1 | * | 9/2002 | Greene | 244/186 |
| 6,522,958 B1 | * | 2/2003 | Dwyer et al. | 701/3 |
| 6,573,841 B2 | * | 6/2003 | Price | 340/963 |
| 6,690,299 B1 | * | 2/2004 | Suiter | 340/973 |
| 2003/0222887 A1 | * | 12/2003 | Wilkins et al. | 345/618 |
| 2004/0183699 A1 | | 9/2004 | Vialleton et al. | |

FOREIGN PATENT DOCUMENTS

WO    WO 2004/053611 A1    6/2004

* cited by examiner

NAVIGATION SYSTEM FOR AN AIRCRAFT AND ASSOCIATED COMMAND PROCESS

CROSS-REFERENCE TO RELATED APPLICATIONS

This application claims priority to French Application No. 0508212, filed Aug. 1, 2005, U.S. Provisional Application No. 60/644,533, filed Jan. 19, 2005, U.S. Provisional Application No. 60/645,050, filed Jan. 21, 2005 and U.S. Provisional Application No. 60/714,341 filed Sep. 7, 2005, the entire contents of which are hereby incorporated by reference.

BACKGROUND OF THE INVENTION

1. Field of the Invention

The invention involves an aircraft navigational system and a related command process.

2. Discussion of the Background

The approach phase prior to landing of an aircraft usually includes two principal stages: a descent at a considerably constant speed from a cruising altitude to an intermediate altitude (generally 3000 feet, or about 1000 m) and a deceleration while maintaining this intermediate altitude to a considerable extent. After these two principal stages, the glide slope for the airport is intercepted, and exactly to the landing strip or runway.

During deceleration, the pilot successively makes high-lift devices (=flaps and slats) evolve from a fully retracted position to a fully extended position while transitioning by intermediate positions. The progressive extension of the high-lift devices indeed permits increasing lift for the aircraft and thus permits a stable flight at lower speeds each time.

When the approach is made according to the classic arrangement mentioned above, the essence of deceleration takes place at constant altitude and the right time for extending each portion of the high-lift devices is as such relatively easy to determine for a trained pilot, by observing the sole parameter that evolves considerably, namely speed, by comparing it with the limit flight speeds (minimum and maximum) with the common configuration.

On the other hand, the classic approach process can reveal itself as annoying from the perspective of sound nuisances on the ground as a result of the progress at relatively low intermediate altitude of the aircraft over a considerable portion of its path.

As a result, it has been proposed to practice a Continuous Descent Approach (CDA), according to which the level of deceleration at constant altitude is eliminated so that the two principal stages of the classic method mentioned above are replaced by a single stage during which the aircraft descends and decelerates simultaneously; this stage is possibly broken down into several sections each having specific descent slopes.

As such, it is understood that speed and altitude vary simultaneously and can in addition, be linked one to the other in a way specific for each approach (for which the principal features are determined by the flight management system), it becomes difficult, even for an experienced pilot, to determine the right moment for extending the various configurations of the high-lift devices, by only observing the actual flight parameters.

SUMMARY OF THE INVENTION

To resolve this problem, among other, the invention proposes an aircraft navigational system that comprises means for calculating an estimated flight path for the aircraft, means for determining an estimated value for a flight parameter that coincides with an estimated speed for extending at least a portion of the high-lift devices of the aircraft and means for displaying an indication for said estimated value.

An indication for the extension of the portion of the high-lift devices involved is as such available to the pilot, which reduces the attention needed for this function, even when the approach path is relatively complex.

The flight parameter is for instance the altitude of the aircraft. Altitude is indeed a parameter frequently checked and easily accessible to the pilot.

The portion involved of the high-lift devices is for instance the one that causes the transition to the first intermediate position, for which it has been determined that altitude was an interesting parameter.

The flight parameter can be the speed of the aircraft that points out the advantages previously mentioned. This parameter is interesting for instance to check the transition from the first intermediate position to the second intermediate position.

The indication mentioned above is for instance a displayed message when the actual speed of the aircraft falls below said estimated value.

The indication can also be a symbol displayed next to the estimate value on a scale of the parameter involved and displayed on a display screen.

This type of solution enables good anticipation of the right moment for extending the high-lift devices by the pilot.

The indication can also be a numeric representation of the estimated value.

According to another mode of execution, the flight parameter can be the aircraft position projected on a horizontal plane. The indication can as such be a symbol located at a representative position of said estimated value on a flight plan displayed on a display screen, which also represents a beneficial solution in terms of anticipation by the pilot of the moment for changing the configuration of the high-lift devices.

The indication displayed can be a function of the portion of the high-lift devices involved, which facilitates the pilot's understanding of the actions to be carried out.

The estimated speed for extending the involved portion of the high-lift devices is for instance a function of a limit speed for stability prior to this extension, for instance, by multiplying this limit speed by a coefficient comprised between 1.01 and 1.1 or by adding a margin comprised between 1 kt and 10 kt. The estimated speed for extending the involved portion of the high-lift devices can as such be easily determined.

The navigational system can also include means for the automatic performance of extending the involved portion of the high-lift devices when the actual value of the flight parameter reaches the estimated value. In this case, the pilot only has to check whether the extension of the various configurations is taking place properly.

The means for calculating an estimated flight path determine for instance a vertical flight path starting from a given lateral path. In this case, the vertical flight path can include at least two joints segments with associated descent slopes (glide slopes) and said estimated value can coincide with the value of the parameter at the junction of the two segments.

The invention also proposes a command process of an aircraft navigational system that includes the following stages:

calculation of an estimated flight path for the aircraft;

determination of an estimated value of a flight parameter corresponding to an estimated speed for extending of at least a portion of the high-lift devices of the aircraft;

display of an indication relative to said estimated value.

Such a process can present optional features of the navigational system proposed above and the advantages resulting from it.

The invention also proposes an aircraft with such a navigational system.

BRIEF DESCRIPTION OF THE DRAWINGS

More details and advantages of this invention will appear from the invention that follows, referenced to the attached schematic drawings, on which.

DESCRIPTION OF THE PREFERRED EMBODIMENTS

On the first figure, the landing procedure used as reference is illustrated. This procedure is the one generally used in a flight management system (FMS) of an aircraft.

In the example selected, it is assumed that the aircraft initially is beginning its descent at a given speed and an altitude of 7000 feet (or 2133.6 meters). (In the description of the paths that follows, the altitude values given are to be considered with respect to the terrain—such an altitude with respect to the terrain is sometimes called "height".) When this aircraft wants to land at an airport, it starts a first phase of descent during which, at constant speed, it moves from an altitude of 7000 feet to 3000 feet. Once this intermediate altitude of 3000 feet is reached, the aircraft slows down, then, progressively, extends its slats and wing flaps to the first intermediate position (here generally, the wing flaps remain in the retracted position) while continuing its deceleration phase. On the figures, transitioning from the configuration where the aircraft wings are fully smooth to the configuration for which the slats and the wing flaps go to a first intermediate position is represented by reference CONF1. During this deceleration phase, the speed of the aircraft diminishes until it descends below a limit speed called S for which the slats and wing flaps of the aircraft move from their first intermediate position to a second intermediate position.

The aircraft then intercepts the glide slope that coincides with the arrival airport. During this last flight phase, the slats and wing flaps of the aircraft adopt a third extended position (CONF3) and eventually a fourth position also called final extended configuration of the slats and flaps or FINAL CONF. This final position as well as the landing speed must be reached by the time that the aircraft is at an altitude of 1000 feet.

The flight path angle during the first descent phase (from 7000 to 3000 feet) is for instance comprised between −2° and −2.5°. In the final landing phase, namely during the glide slope, this flight path angle is for instance −3°.

Figure 1:
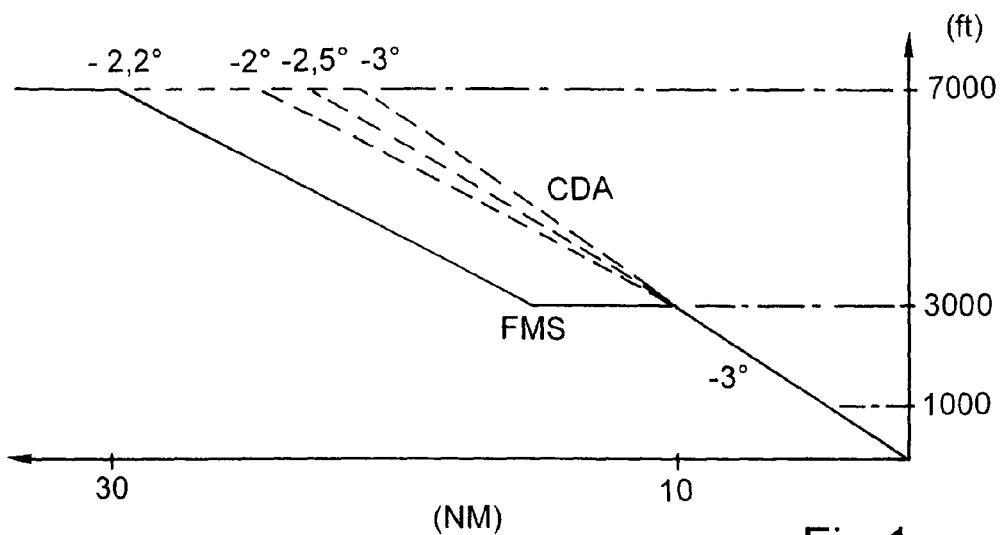
FIG. 1 is a diagram that represents the altitude of an aircraft as a function of the distance that separates it from its landing point for landing procedures according to the previous state of the art.

Another landing process is known by the name of CDA (for "Continuous Descent Approach"). For such an approach, the descent phases at constant speed and deceleration at constant altitude are grouped in one descent phase with deceleration. For this CDA approach, there is no constant altitude level. The aircraft first descends from its begin descent altitude (for instance 7000 feet) to an altitude of about 3000 feet with a flight path angle between −2° and −3° for instance. FIG. 1 illustrates in a dotted line a flight path angle of −2°, another of −2.5° and a third one of −3°. For this approach, the aircraft goes from its configuration in which it has a smooth external surface (CONF0) to its first configuration with extension of the slats and flaps (CONF1) when it reaches a speed called GD (for "Green Dot"). This limit speed is used during a landing phase of an aircraft as well as during a takeoff phase. Going from the first intermediate position of the slats and flaps of the aircraft to the second intermediate phase of the slats and flaps takes place when the aircraft reaches speed S. This transition is referenced on the drawings by CONF2.

In general, for a classic landing procedure like the one recorded in a flight management system of an aircraft as for the CDA approach procedure, the landing gear of the aircraft is extended after transitioning to the second intermediate position of the slats and flaps or shortly after passing this transition point.

It has been observed that the fact of using the basic CDA process for landing rather than using the process programmed in the flight management system was beneficial for long haul aircraft and was practically without impact for the smaller planes.

The table below summarizes a basic CDA type approach:

| Altitude (in feet) | Event |
|---|---|
| 7000 feet | Starting point: engine at idling, smooth outside surface (CONF0), landing gear retracted |
| 7000-3000 feet | Flight path angle: between −2° and −3° (preferably between −2° and −2.5°) Idling thrust GD--->CONF1 Speed S ---> CONF2 |
| About 3000 feet | Interception of the descent axis/slope |
| Below 3000 feet | If CONF2 ---> landing gears extended Speed F ---> CONF3 Speed F ---> FINAL CONF Deceleration to Vapp (Approach speed) |
| After reaching Vapp (approach speed), this is, above 1000 feet | Descent at constant speed Flight path angle −3° Landing |

Figure 2A:
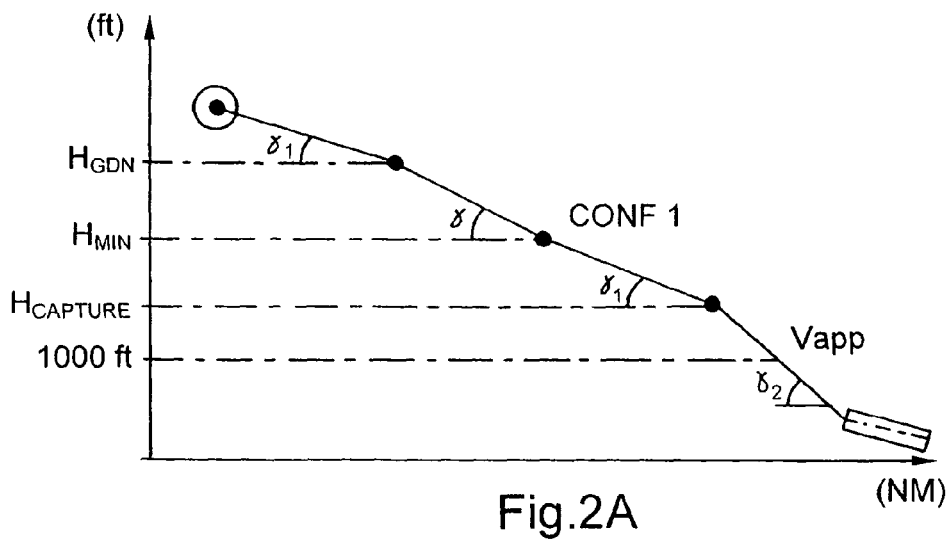
FIG. 2A is a diagram that corresponds to the diagram of FIG. 1 for a landing procedure according to the invention.

The diagram of FIG. 2A illustrates an optimized CDA landing procedure. This procedure comprises several stages described below.

Here, it is assumed that the aircraft starts for instance also from an altitude of 7000 feet. During a first phase, the aircraft starts its descent with a flight path angle of γ1. During this first phase, the aircraft decelerates to a GDN speed below the GD speed mentioned above but while staying with its smooth configuration (CONF0). At the end of this first phase of descent, the aircraft arrives at an altitude $H_{GDN}$ with speed GDN (<GD).

Then it starts a second phase of descent with a variable γ flight path angle, in other words, not imposed. In terms of an absolute value, γ is generally higher than γ1. During this second phase of descent, the speed of the aircraft is considerably constant (due to the fact that the speed set point is GDN) and the aircraft descends down to altitude $H_{MIN}$. At the end of this second phase of descent, the slats and flaps of the aircraft move to the first intermediate configuration CONF1: this corresponds for instance to the extended position of the slats of the aircraft with a first angle of deflection.

The third phase of descent is a deceleration phase. The flight path angle is for instance γ2. The aircraft then goes from altitude $H_{MIN}$ to altitude $H_{CAPTURE}$. At this last altitude, the aircraft reaches the final approach axis or slope, which can be of the ILS, MLS, GBAS or SBAS type. Assuming an interception of an ILS axis, the aircraft then intercepts the ILS signal (Instrument Landing System).

Then, it starts the last phase of the landing procedure that is imposed for each airport. During this last phase, the aircraft speed decreases to Vapp and the flight path angle is for instance γ2. At the latest, when reaching an altitude of 1000 feet, the aircraft is in its final landing configuration.

As digital example, one sees that γ1=−2° or −2.2° while γ=−2.5°. Generally, γ2=−3°.

The table below summarizes the various data of an optimized landing procedure according to the invention:

| Altitude | Event for optimized approach |
| --- | --- |
| 7000 feet | CONF0: smooth configuration<br>Idling thrust<br>Speed < Cruising speed |
| 7000 feet | Flight path angle: between −2° or −2.5° (or 0°)<br>Reduced thrust<br>Deceleration to GDN speed |
| $H_{GDN}$ | Maintains constant speed, variable flight path angle<br>Descent to an altitude $H_{MIN}$ --->CONF1 |
| $H_{MIN}$ | New flight path angle: −2° or −2.5°<br>Deceleration to SN--> CONF2 |
| About 3000 feet | Interception of the glide axis or slope |
| Less than 3000 feet | Speed F ---> CONF3<br>If CONF3 ---> landing gear out<br>Speed F ---> FINAL CONF<br>Deceleration to Vapp (approach speed) |
| After reaching the Vapp speed, this is, above 1000 feet | Descent at constant speed<br>Thrust adjusted to a flight path angle of −3°<br>Final landing procedure |

In this table, a speed GDN and a speed SN have been introduced. We have the following equations:

$$GDN = GD - \Delta 1$$

$$SN = S - \Delta 2$$

The values for Δ1 and Δ2 however are dependent on the aircraft. Indeed, it has been observed that for each aircraft, it was possible to move the slats and flaps to their first intermediate configuration, to their second intermediate configuration respectively at speeds respectively lower than speeds GD and S usually required.

Altitude $H_{GDN}$ is determined on the basis of the initial point altitude (in the example selected: 7000 feet) and of the deceleration distance required to go from the initial point speed to speed GDN while maintaining a predetermined flight path angle.

Altitude $H_{MIN}$ is a given minimal altitude for an aircraft weight to ensure its stabilization above or at an altitude of 1000 feet above the landing strip.

Speeds GDN and SN do not replace speeds GD and S indicated previously. These are complementary speeds that can be indicated to the pilots on a display screen or monitor as alternate speeds to obtain noise reduction (or basic speeds for the noise reduction procedures). These speeds are then used only in the cases when the safety and airworthiness of the aircraft have not deteriorated. These speeds (GDN and SN or else values Δ1 and Δ2) are determined according to the type of aircraft and of its weight.

One observes that speed SN can be reached below 3000 feet but always, above 1000 feet, needless to say.

The optimized approach procedure can be programmed in the flight management system (F MS) of the aircraft. The various parameters are calculated in reverse from the landing strip.

During a first stage, one considers first of all that the Glide Slope has been complied with. This geometric segment is covered at a Vapp speed from the landing strip up to an altitude of 1000 feet above this one at a slope γ3 that is generally −3°, or any other slope indicated by the procedure agreed with the air traffic controller. Above 1000 feet, one considers that the engines are close to idling and one determines the speed at the intersection point with the glide slope (for instance 3000 feet or else $H_{CAPTURE}$). Here, one takes into account the transition from the first intermediate position of the slats and flaps to their second intermediate position. Here, one must consider that this transition takes place at a speed below SN (and not S) so as to take into account the deployment time of the slats and wing flaps.

Always while calculating in reverse, from the capture altitude of the glide slope and of the speed of the aircraft at this location, altitude $H_{MIN}$ is determined at which the aircraft is flying at a speed GDN and moves from the position in which the slats (and flaps) are occupying their first intermediate position to the smooth outside configuration (slats and flaps retracted), while taking into account the time needed for deploying the slats and flaps.

One considers that this segment is covered with a constant flight path angle γ2 located for instance between −2° and −2.5°. This flight path angle is selected as high as possible as an absolute value to remove the overflight path as much as possible and sufficiently low to permit optimal deceleration (sufficiently strong so as not to extend the flight path unnecessarily) up to speed GDN and can depend for instance of the weight and type of aircraft.

During a third stage of calculation, one considers that the aircraft is climbing at a constant speed corresponding to speed GDN, to an altitude $H_{GDN}$. One considers here, when transitioning from altitude $H_{MIN}$ to altitude $H_{GDN}$ that the engines are close to idling, with a thrust margin during the design of the profile that permits, during the actual approach, absorbing inaccuracies linked to plane weight data, to that of the wind model used by FMS, to that of the calculations and to that of actual guidance. The flight path angle is for instance −3°.

Calculation of the last segment (that coincides with the first phase of deceleration) is not calculated in reverse but from the point when the aircraft starts its descent. Starting from this point, the aircraft decelerates, possibly at constant altitude (that is then the $H_{GDN}$ altitude) to go from its cruising speed to the GDN speed. The path of the aircraft is then determined by making the intersection of these two last calculated segments.

Figure 2B:
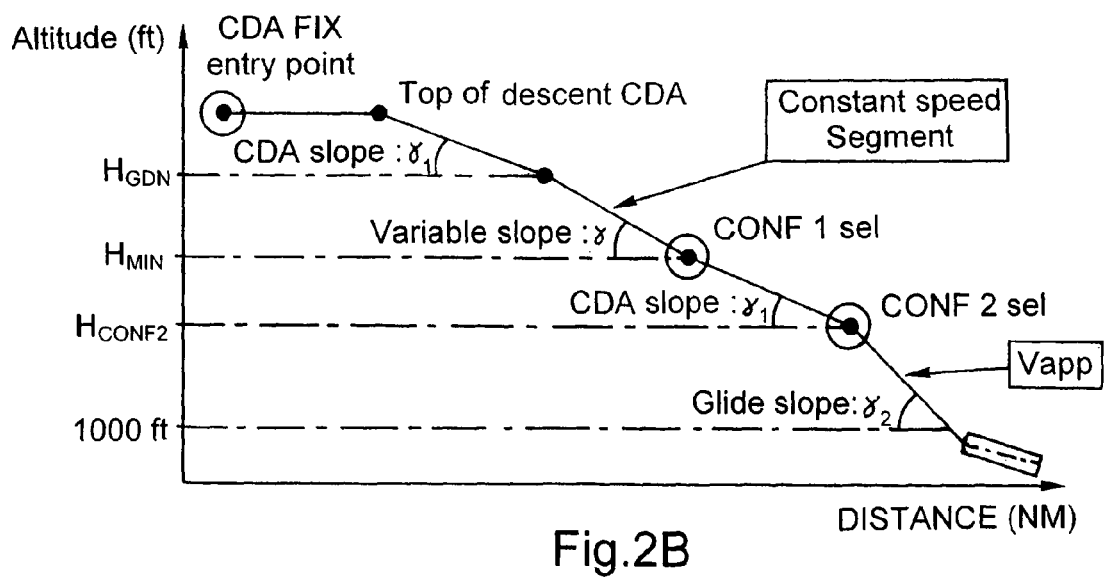
FIG. 2B is a diagram illustrating a variant of the landing procedure of FIG. 2A.

A variant of the optimized CDA landing procedure is represented by FIG. 2B. The path parts common to FIGS. 2A and 2B as well as the corresponding calculation stages (first three stages below), will not be described again.

According to this variant, in a fourth calculation stage, one considers for defining the profile that the plane climbs to slope γ1 defined previously, by accelerating, until it reaches the altitude programmed for the beginning of the DCA at a speed lower than the one of end of descent.

During the fifth and last segment foreseen for this mode of execution, the plane accelerates at level until reaching the speed of end of descent, then, continues at constant speed up to the point that the aircraft starts its optimized CDA procedure, the so-called "CDA Fix Entry Point". The speed of end of descent mentioned above is directly or indirectly controlled by the crew, or dictated by the crew, or by the flight management system (FMS), resulting from the classic optimizations conducted by the latter, for instance by meeting a flight duration/fuel consumption criterion, or by meeting an imposed arrival time, for instance to the "CDA Fix Entry Point".

Here, it is not a question of doing away with values like GD and S for instance from the flight management system memory of the aircraft. Here, values GDN and SN must be added into this memory. Indeed, on the one hand, values GD and S are used not only during landing but also during takeoff and on the other hand, under certain flight conditions, it may be necessary, for safety and/or comfort reasons to extend the slats at speed GD and the flaps at speed S (and not at GDN and SN).

For the transition to a given configuration, corresponding to an intermediate extended position of the slats and flaps, there is a required transition speed as well as a VLS speed (Limit Selection Speed) below which the transition to the configuration considered must not be undertaken (such as for reasons of flight safety). These speed ranges depend on the type of aircraft as well as its weight.

As an example, let us assume that for an aircraft with a weight of 180 tons, the classic GD speed recommended to extend the slats (transition to CONF1) is 230 kt (1 kt=1.852 kms/hr). The minimum speed for transitioning to the first intermediate position of the slats and flaps (CONF1) is for instance VLS1=195 kt. The speed interval length for which the transition to CONF1 is possible is 35 kt. To limit the ground noises, one must select a speed GDN as closely as possible to VLS1. However, for safety and airworthiness reasons, a margin must be preserved. In such case, one can select GDN=205 kt (or GDN=VLS1+10 kt). Then, with respect to the equations defined above, we get Δ1=25 kt.

For this same plane, speed S corresponding to the extension of the flaps and as such transition to the second intermediate position of the slats and flaps (CONF2) is for instance 186 kt. Minimum speed for transitioning to CONF2 is for instance VLS2=161 kt. Here, we have selected SN=166 kt for instance.

The flight management system proposed here includes classically, an alphanumeric keyboard and a Multi Function Control and Display Unit (MCDU). During the takeoff and landing phases, speed GD is displayed on the MCDU. Here, the invention proposes a form of execution that provides for a landing phase, that the MCDU also displays the GDN speed that permits reducing the aircraft noise by flying with a smooth configuration.

It should be pointed out here that the GD (Green Dot) speed is initially the speed that when an engine has failed, enables the best climbing speed. This speed is also used in general as final takeoff speed. In the previous state of the art, it is also the speed recommended from which the slats of an aircraft can be extended during an approach of a landing strip.

Likewise, speed S is for takeoff and for landing. At takeoff, it is the speed above which the outside configuration of the aircraft can be fully smooth (transition to CONF0). During landing, it is the classic speed for extending the flaps (in other words, transition to CONF2).

There are also speeds recommended for transitioning to the third intermediate position of the slats and flaps (CONF3) as well as for transitioning to the final configuration during which the slats and flaps are fully extended. These speeds are used only during landing. As for speed S, these speeds are for instance displayed on the MCDU. Here, it is proposed to display speed SN also on this device.

Here it is pointed out that the landing gear is extended preferably after transitioning to the third intermediate position of the slats and flaps, or CONF3.

Figure 4:
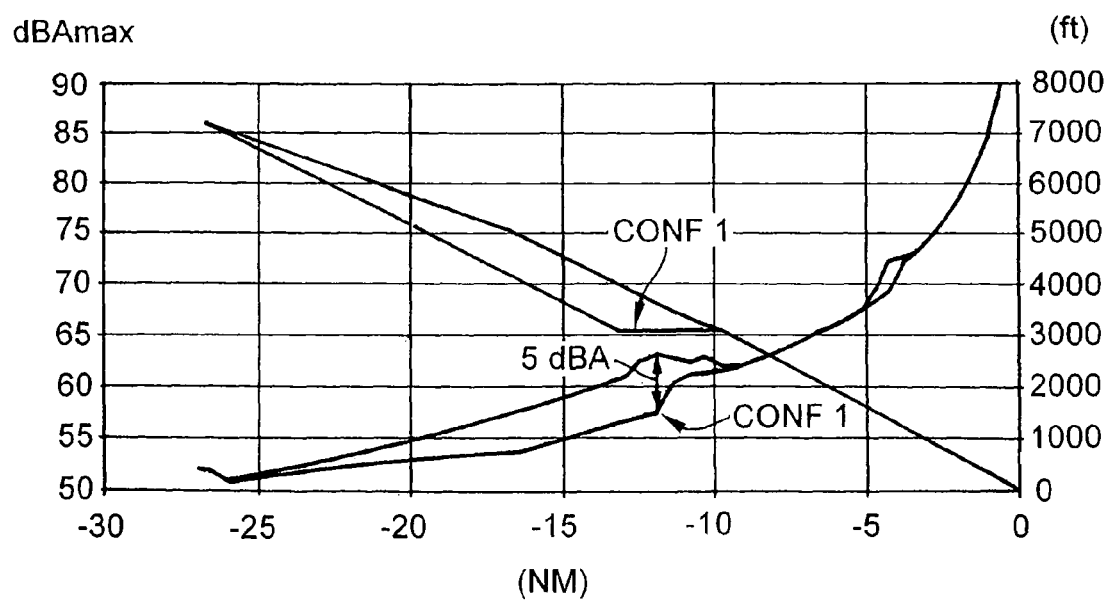
FIG. 4 illustrates for a given aircraft model the gain in terms of noise obtained thanks to the optimized landing process according to the invention.

The approach procedure for a landing strip described above permits limiting to a considerable extent the ground noises near this landing strip. FIG. 4 illustrates the gain obtained. On this figure, we have shown the aircraft path, in other words, the altitude of the aircraft with respect to the distance to the landing strip and on the other hand, the ground noise on the basis also of the landing strip distance. Logically speaking, the curves involving the noise overlap on the one hand when the aircraft is flying at cruising speed and at the beginning of descent and on the other hand, at the time of landing when the landing procedure does not impact the last flight segment before reaching the landing strip. The end-of-flight glide slope is not modified during a landing procedure according to the invention.

The process according to the invention also permits a reduction of fuel consumption of the aircraft. In addition, the landing procedure is slight faster and permits a time gain.

Figure 5:
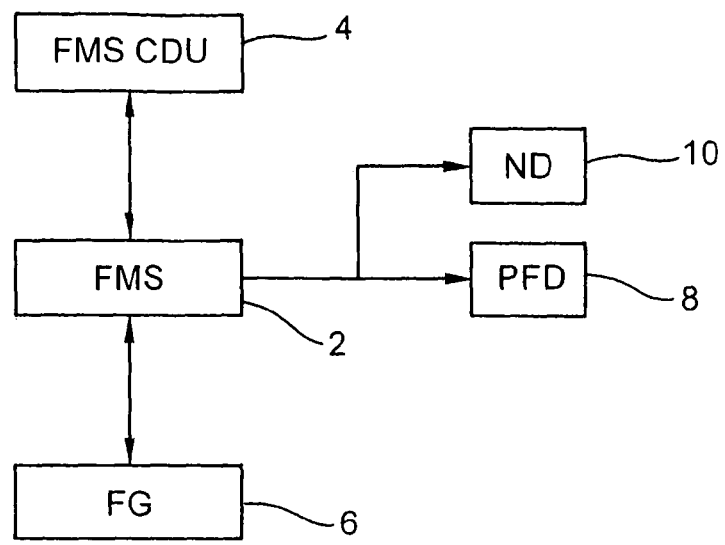
FIG. 5 represents that principal elements of a navigation and guidance system adapted to implement the invention.

FIG. 5 shows the principal elements of a navigation system capable of guiding the system during an optimized CDA procedure and to give the pilot indications to determine (and even anticipate) the right moments for extending (manually or automatically) the various configurations of the high-lift devices. These indications are particularly interesting in the case of a continuous descent approach (for which the case that has just been evoked represents a particular example), but could of course also be used during an approach according to a classic process. In this case, they also permit for the crew an easy implementation of their actions consistent with the path estimated by the flight management system (FMS) 2.

The flight management system (FMS) of the aircraft is referenced as 2 on FIG. 5. With the crew, it exchanges data through a control and display unit (CDU such as for instance the MCDU mentioned before), referenced as 4 on FIG. 5.

Flight management system (FMS) 2 also receives information from an automatic piloting system 6 (or FG—Flight Guidance) such as for instance the actual speed of the plane $V_{a/c}$ or the maximum speed with the configuration of the high-lift devices to come (in other words, the next extended configuration) $V_{ie}$.

Flight management system (FMS) 2 sends information to a primary flight parameter display screen 8 (or PFD—Primary Flight Display) and to a navigation screen 10 (or ND—Navigation Display), such as those described below in detail.

Flight management system (FMS) 2 calculates the path in the space provided for the a flight, such as the path considered for the descent such as for instance here the optimized continuous descent approach path described above, and that is used to guide the automatic piloting by the transmittal of information to the automatic piloting system 6. As such, it is an estimated path that the aircraft should follow in the absence of incidents and on the basis of which it is possible to predict the supposed evolution of parameters during the subsequent phases of the flight, such as for instance, the estimated speed of the plane.

As such, it is possible to estimate at what point (referenced by its coordinates in horizontal projection and by its altitude) of the path (here of the descent), the aircraft should reach a given speed value, especially for the speed values proposed for the extension of the various high-lift device configurations.

Flight management system 2 can as such transmit to navigation screen 10 (ND) the "WPT for CONF1" and "WPT for CONF2" (projected in the horizontal plane) at which the estimated speed of the aircraft coincides respectively with the recommended speed for transitioning the high-lift devices from the fully retracted CONF0 position to the first intermediate COF1 position and to the recommended speed for transitioning the high lift devices from the first intermediate CONF1 position to the second intermediate CONF2 position. These speeds suggested for transitioning to a new configuration are slightly higher than the limit speed for the stability of the aircraft with the current configuration, as explained in greater detail below.

According the continuous descent approach proposed above, these transition speeds (GDN, SN) coincide with slope changes of the path foreseen by flight management system 2. In general, these estimated speeds for changing the configuration can intervene at any time of descent, without necessarily being accompanied by a slope change.

Figure 6:
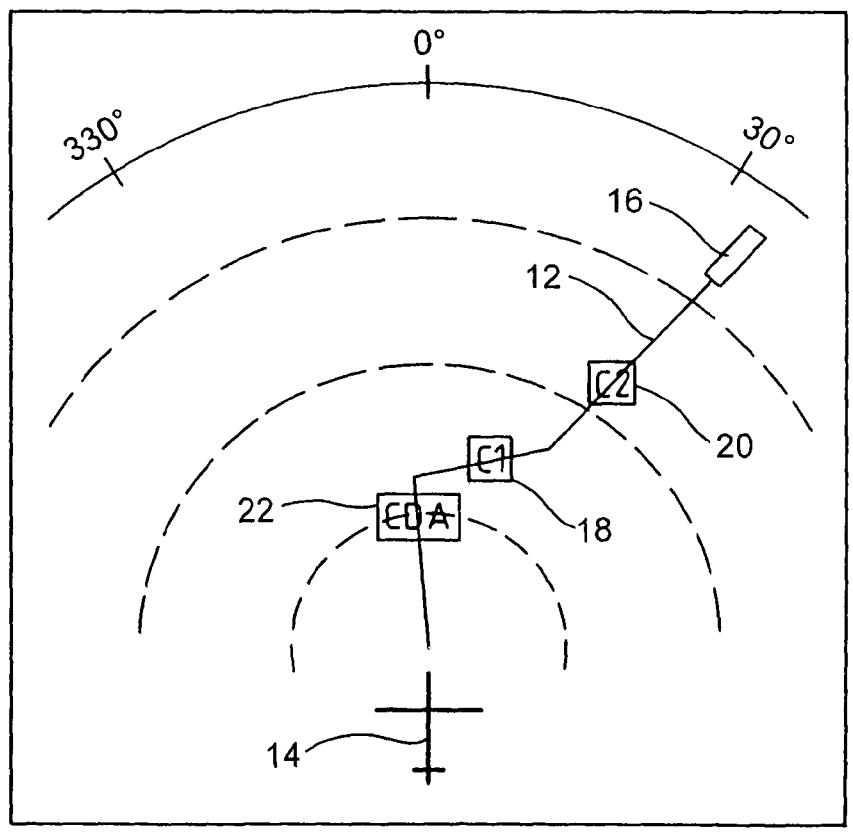
FIG. 6 represents a navigation screen before the start of a continuous descent approach.

FIG. 6 represents the navigation display (ND) 10 before starting a continuous descent approach.

The navigation diagram 10 displays among other the projection in the horizontal plane of the estimated path in the form of a continuous line 12 located between a representation of the aircraft 14 and a representation of the landing strip 16.

Navigation display 10 also displays symbols 18, 20 designating the points for which it is foreseen that the aircraft reaches (as a result of its deceleration) the values recommended respectively for transitioning to the first intermediate position and for transitioning to the second intermediate position of the high-lift devices.

These symbols 18, 20 are positioned on the path (continuous line 12) on the basis of the "WPT for CONF1" and "WPT for CONF2" information received from flight management system 2 as already mentioned.

These symbols 18, 20 are for instance displayed as soon as the estimated path of the aircraft for its continuous descent approach is determined. Symbols 18, 20 are in fact erased when the applicable position has been passed or when the continuous descent approach mode is deactivated or disarmed.

In addition, on FIG. 6 it is proposed to display a symbol 22 that is representative of the estimated position on the path for which the flight management system 2 has scheduled that the continuous descent approach must start.

Thanks to the display of symbols 18, 20, 22 (that represent the transition predictions for these three new characteristic points), the pilot has an overall view of the approach and can anticipate the times when he has to modify the configuration of the high-lift devices.

The flight management system 2 transmits to the primary flight parameter display screen 8 (PFD) the estimated altitude $H_{CONF1}$ at which it is scheduled (according to the descent scheme calculated by flight management system 2) that the speed reaches the speed suggested for the transition of the high-lift devices to the first intermediate position CONF1 (in the example here $H_{CONF1}=H_{MIN}$). Flight management system 2 also transmits to the primary flight parameter display screen 8 information about the $V_{CONF2}$ value of the flight speed that applies for the same approach to the transition of the high-lift devices to the second intermediate position (here $V_{CONF2}$=SN).

These estimated values of altitude and speed can be determined for instance as follows, by using at this time the minimum VLS speeds in each configuration, used and provided by the automatic piloting system 6:

altitude $H_{CONF1}$ is the altitude at which the flight management system 2 provides for a speed equal to the minimum VLS speed used in the retracted position of the high-lift devices, plus five knots, which can be represented as follows:

$V_{estimated}(H_{CONF1})=VLS$ (smooth)+5 kt;

speed $V_{CONF2}$ is equal to the minimum VLS speed used with the high-lift devices in the first intermediate position, plus five knots, or: $V_{CONF2}=VLS$ (CONF1)+5 kt As a variant, the five knot margin used could be replaced (in one case or another, or in two) by multiplication with a coefficient, for instance, 1.05. Then, we would have:

$V_{estimated}(H_{CONF1})=VLS$(smooth)×1.05 and $V_{CONF2}=VLS(CONF1)\times 1.05$ Values $H_{CONF1}$ and $H_{CONF2}$ are determined by the flight management system 2 on the basis of the minimum VLS speed information used and supplied by the automatic piloting system 8.

Figure 7:
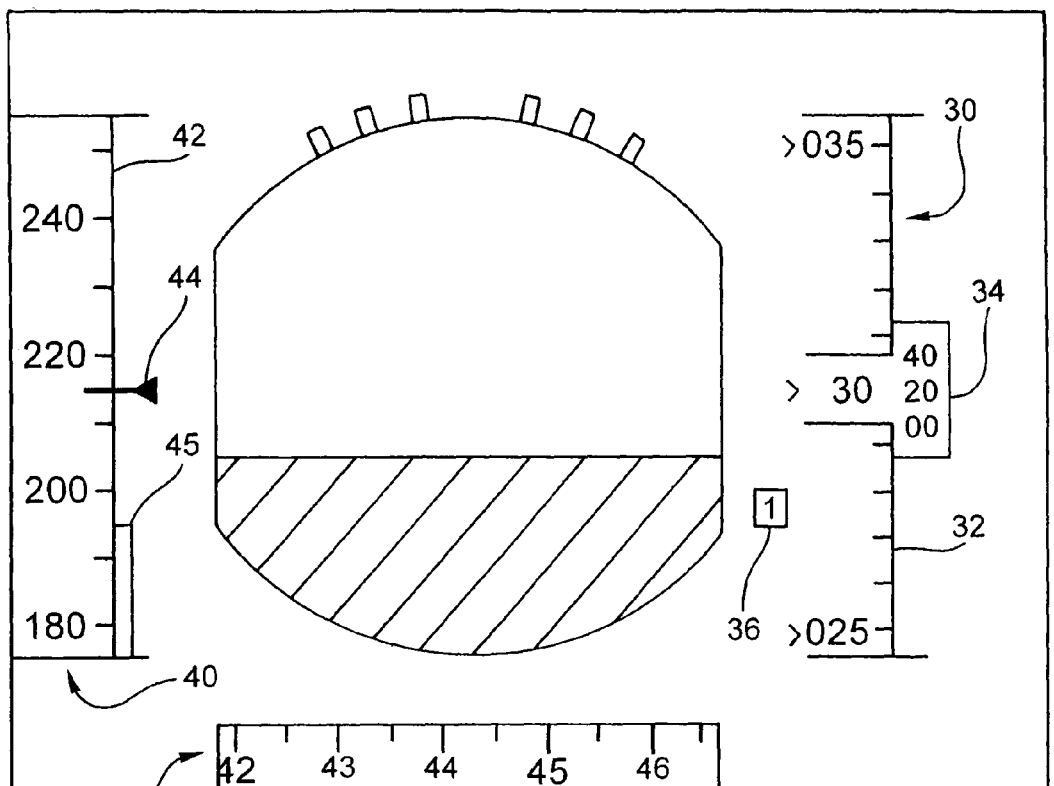
FIG. 7 represents a primary flight parameter display screen before the high lift devices are extended.

FIG. 7 shows the primary flight parameter display screen 8 at a moment of flight prior to the transition of the high-lift devices to the first intermediate position.

The primary parameter display screen includes among other an altitude indicator 30, a speed indicator 40 and an orientation indicator (in horizontal place) 50.

Altitude indicator 30 includes a mobile scale 32 that indicates the altitude values around the actual value (or the current value). Altitude indicator 30 also includes a fixed display 32 of the current altitude. (Here, this is in general of the altitude with respect to any reference selected, in general with respect to sea level).

During altitude variations of the plane, mobile scale 32 scrolls vertically so that fixed display 34 is positioned on this scale at the level of the current altitude value (or 3020 ft on FIG. 7).

In the example shown here, mobile scale 32 shows indications in hundreds of feet while fixed display 34 is read by combining the first figures (in hundreds of feet) and figures on the right expressing the tenths and the units of the current altitude value in feet.

An indicator of estimated altitude $H_{CONF1}$ for extending the high-lift devices in the first intermediate position is displayed on mobile scale 32 in the form of a symbol 36 at the level of the region of the scale representing altitude $H_{CONF1}$, namely 2800 ft in the example shown. Symbol 36 for instance has a form that is tied to the designation of the first intermediate position of the high-lift devices: here, symbol 36 includes a "1" to remind us of designation "CONF1" that corresponds to the first intermediate position of the high-lift devices.

As already mentioned, the indicator of the estimated altitude $H_{CONF1}$ is part of mobile scale 32 and is as such mobile with it so that during descent, symbol 36 follows the vertical scrolling towards the top of scale 32 and thus approaches the actual altitude, which enable the pilot to foresee in advance the time when the altitude that corresponds to the estimated speed is reached for the transitioning of the high-lift devices to the first intermediate position.

So as not to overload the display, one can provide that symbol 36 only appears when the following conditions are met: CDA continuous descent approach mode selected, active descent phase, fully retracted position CONF0 of the high-lift devices, speed of plane below the maximum speed for the first position CONF1 of the high-lift devices ($V_{fe}$ given for the automatic piloting system 6 as already indicated), automatic navigation mode of the flight plane engaged (in lateral).

In addition, to improve pilot anticipation even more, one can select to indicate numeric value $H_{CONF1}$ at one end of the current altitude scale is too high for symbol 36 to be displayed inside the displayed scale portion.[sic]

Speed indicator 40 includes a mobile scale 42 and a fixed cursor 44 (that points to a current speed of 215 kt on FIG. 7). These elements will be described in detail when making reference to FIG. 8. It also includes an indicator 45 of the minimum VLS speed used in the current configuration (here 195 kt).

Figure 8:
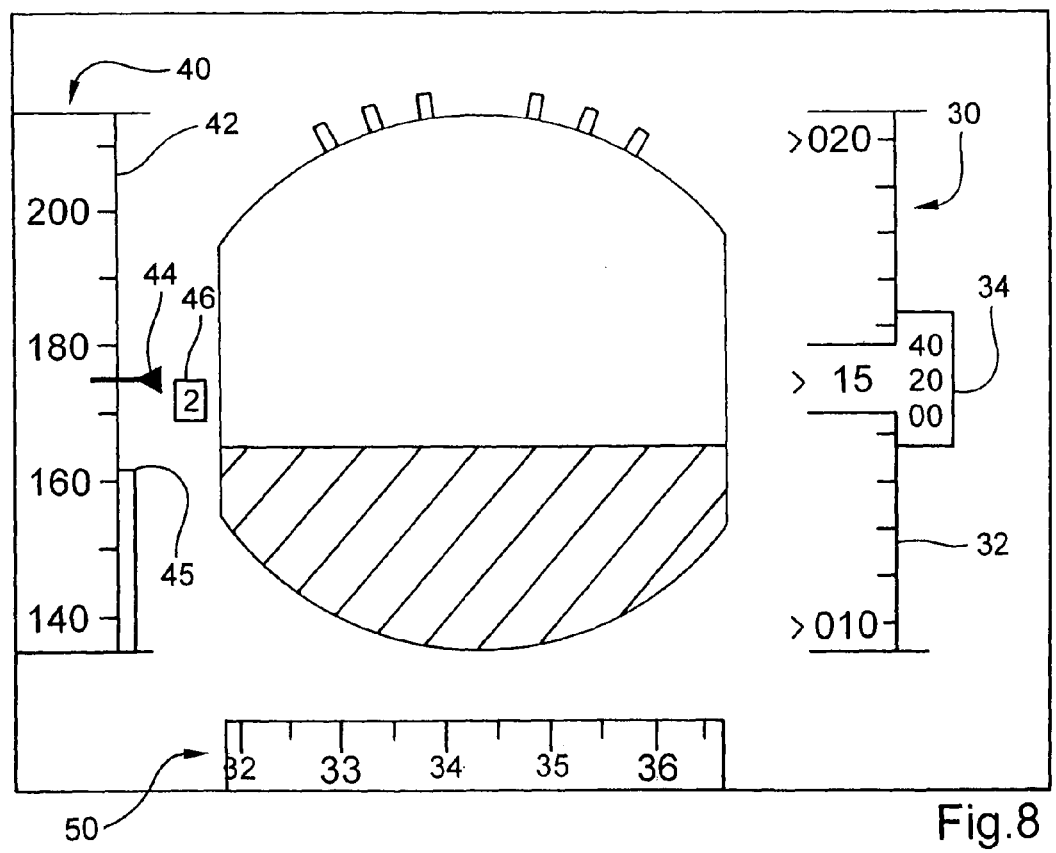
FIG. 8 represents the screen of FIG. 7 after a first portion of the high-lift devices is extended and before the extension of a second portion of the high-lift devices.

FIG. 8 represents the display screen of the primary parameters after transitioning from the first intermediate position CONF 1 and before transitioning to the second intermediate position CONF2 of the high-lift devices.

The elements of FIG. 8 will not be described again in detail since they correspond essentially to those of FIG. 7 and bear the same references.

Here in particular, of interest is speed indicator 40. On it, a speed indicator $V_{CONF2}$ suggested for transitioning the high-lift devices to the second intermediate position CONF2 is displayed in the form of a symbol 46 integral with mobile speed scale 42, at the level of the region of this scale that corresponds to this suggested speed $V_{CONF2}$.

As for the estimated altitude indicator for transitioning to the CONF1 position on FIG. 7, this symbol 46 is selected with a form that reminds us of the usual designation of the second intermediate position CONF 2: symbol 48 indicating the recommended speed for transitioning to the second intermediate position CONF2 is represented here in the form of a "2".

Speed indicator 40 also indicates the minimum VLS speed used with the current configuration (here, first position CONF1 of the high-lift devices, or a speed VLS of 161 kt while taking the example described above).

Indicating symbol 46 of speed $V_{CONF2}$ is displayed on mobile scale 42 at a position that corresponds to value $V_{CONF2}$ received from flight management system 2. Indicating symbol 46 is mobile and integral with mobile scale 42. When the plane decelerates during the approach stage, the pilot sees how this symbol 46 scrolls vertically upward to near fixed cursor 44; at that time, he understands that it is suggested to him to trigger the transition to the second intermediate position CONF2 of the high-lift devices, which in fact he could have anticipated by the fact of the vertical scrolling mentioned above.

As before, so as not to overload the display, one can foresee that symbol 46 is only displayed when all of the following conditions are met: CDA continuous descent approach mode selected, active approach phase, speed of the plane less than the maximum speed for the second intermediate position CONF 2 of the high lift devices, second intermediate position of the high-lift devices CONF2 not yet selected, automatic navigation mode of the lateral flight plane.

One is able to observe that in both of the preceding cases represented respectively on FIGS. 7 and 8, the display of symbols 36, 46 permits to indicate to the pilot the estimated value respectively of altitude $H_{CONF1}$ and speed $V_{CONF2}$ for extending a portion of the high-lift devices; these indicators are not aimed however to indicate directly that the altitude or the speed are actually reached by the plane. To do so, one can also provide for the display of a specific message to the pilot, for instance on the primary parameter display screen 8, when these values are actually reached by the plane and the pilot did not select the recommended slats/flaps configuration.

Figure 9:
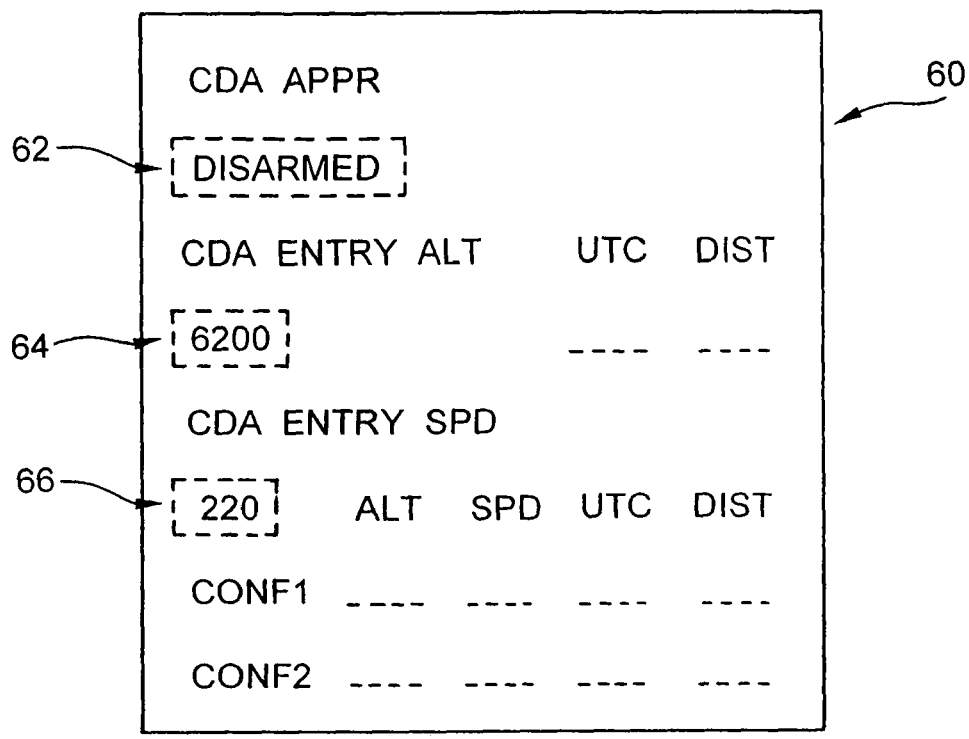
FIG. 9 represents a control screen of the continuous descent approach function before its activation.
Figure 10:
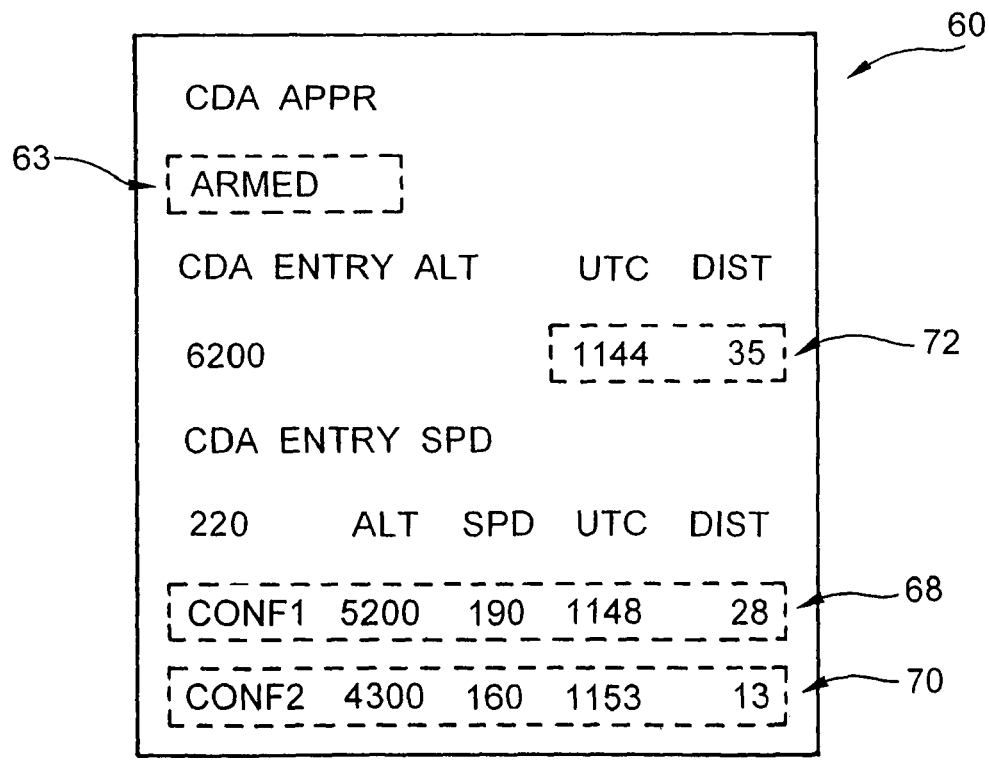
FIG. 10 represents the screen of FIG. 9 after activation of the continuous descent approach mode.

FIGS. 9 and 10 represent possible examples of the display screen for the continuous descent approach management. For instance, it is a screen of a control and display unit already mentioned.

Figure 3:
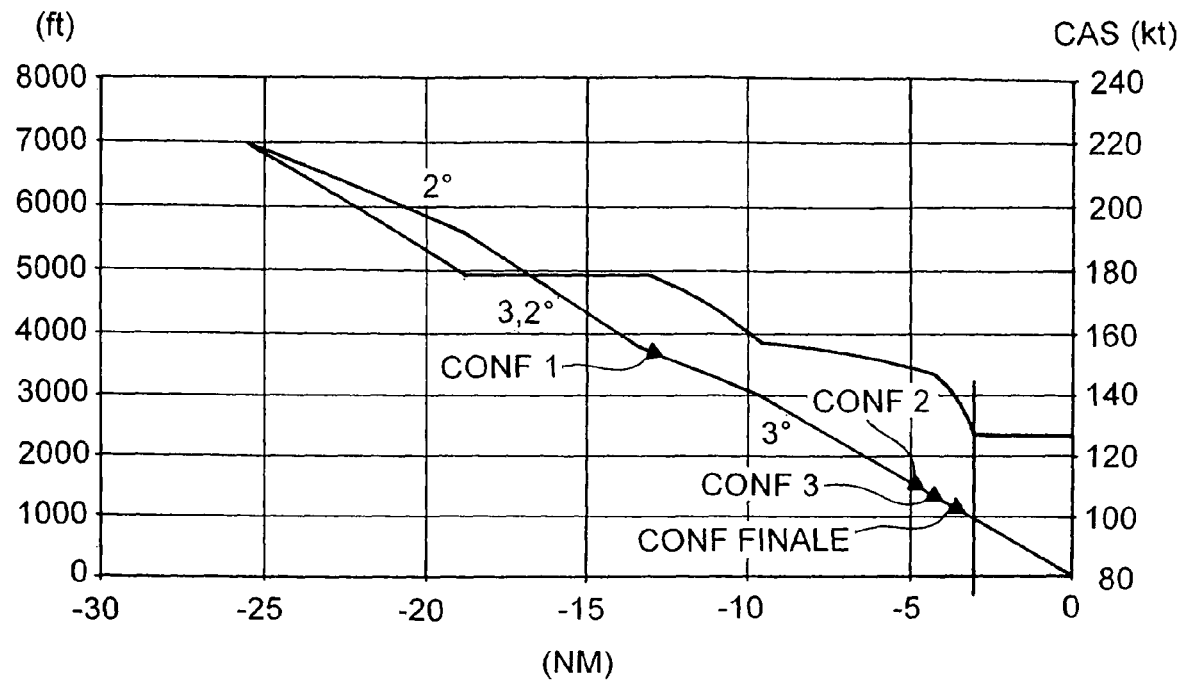
FIG. 3 shows an example of a landing profile according to the invention showing the speed and altitude of the aircraft as a function of the distance separating it from the landing strip.

In addition, one will observe that, if in the preceding display examples, the values used in the optimized continuous descent approach described in FIGS. 2 to 4 have been shown again, the displays in FIGS. 9 and 10 refer to another continuous descent approach case and consequently show other flight parameter values.

FIG. 9 represents display screen 60 when the optimized continuous descent approach mode is deactivated, which is indicated by the mention "DISARMED" in a continuous descent approach status indicator 62.

Display screen 60 then displays only the programmed altitude and speed values for starting the continuous descent approach, for the case when the latter is triggered.

These altitude and speed values for starting the continuous descent approach are displayed respectively in a region 64 under the mentioned "CDA ENTRY ALT" and in a region 66 under the mention "CDA ENTRY SPD".

The altitude and speed values for starting the continuous descent approach are for instance known by the database of the flight management system (FMS) 2 and can be modified by the crew according to air traffic control indications.

As already mentioned, the display screen 60 is limited to displaying values that are mentioned when the continuous descent approach is deactivated, and no flight parameter value is as such indicated for transitioning to the various high-lift device configurations.

FIG. 10 represents the display screen 60 after activation of the continuous descent approach, which is indicated by the display of the "ARMED" legend in reference 63, instead of the previous referenced legend 62.

As already indicated, after activating the continuous descent approach, flight management system 2 determines the vertical path estimated for this approach. It also calculates the value of a certain number of parameters that correspond to the time suggested for transition to the first intermediate position CONF1, then to the second intermediate position CONF2 of the high-lift devices. These values of the parameters are displayed in numeric form respectively in a region 68 for the first intermediate position CONF1 and in a region 70 for the second intermediate position CONF2.

In the example shown on FIG. 10, the flight parameters respectively displayed are from left to right, altitude, speed as well as the transition time and the remaining distance to cover to reach the characteristic point considered along the lateral path of the flight plane. You are reminded that these values of the parameters are estimated by the flight management system 2 on the basis of the path determined by this same system to make the continuous descent approach.

It is also proposed, as reference on FIG. 10, to display the time of entering the descent phase and the distance with respect to the arrival at the beginning of this descent in a region 72 of display screen 60.

The points considered above ("CDA Fix Entry Point", CONF1 and CONF2) are also displayed on the page that shows the flight plan segments that lists the different points of the path (and the characteristics qui are associated therewith) as they are calculated by the flight management system.

The examples that have just been given are only possibilities for implementing the invention that is not limited thereto.

The invention claimed is:

1. A navigation system for an aircraft with high-lift devices, comprising:
    means for calculating an estimated flight path for the aircraft;
    means for determining an estimated value of a flight parameter that corresponds to an estimated speed, an extension of at least a portion of the high-lift devices of the aircraft being performed in view of the estimated value;
    means for displaying on a display screen a symbol at a position representative of said estimated value,
    wherein the estimated value is a unique value of the flight parameter and the symbol is positioned on the display screen so as to distinctly represent the unique estimated value and show, in advance, a specific time for the extension of the portion of the high-lift devices of the aircraft.

2. The navigation system according to claim 1, wherein the flight parameter is the altitude of the aircraft.

3. The navigation system according to claim 2, wherein said extension of at least a portion of the high lift devices coincides with a transition from a fully retracted position to a first intermediate position.

4. The navigation system according to claim 1, wherein the flight parameter is the speed of the aircraft.

5. The navigation system according to claim 4, wherein said extension of at least a portion of the high-lift devices corresponds to a transition of a first intermediate position to a second intermediate position.

6. The navigation system according to claim 1, 2 or 4, wherein the symbol is displayed at said estimated value on a scale of the parameter displayed on the display screen.

7. The navigation system according to claim 1, wherein the flight parameter is the position of the aircraft in a horizontal plane.

8. The navigation system according to claim 7, wherein the symbol is situated in the representative position of said estimated value on a flight plan displayed on the display screen, said flight plan being a projection in a horizontal plane of the estimated flight path.

9. The navigation system according to claim 1 wherein the displayed symbol depends upon the portion of the high-lift devices involved.

10. The navigation system according to claim 1, wherein said estimated speed is a function of a limit speed for stability before said extension of at least a portion of the high-lift devices.

11. The navigation system according to claim 10, wherein the estimated speed is said limit speed multiplied with a coefficient between 1.01 and 1.1.

12. The navigation system according to claim 10, wherein the estimated speed is said limit speed plus a margin between 1 kt and 10 kt.

13. The navigation system according to claim 1, comprising means for conducting said extension of at least a portion of the high-lift devices when the actual value of the flight parameter reaches said estimated value.

14. The navigation system according to claim 1, wherein the means for calculating said estimated flight path determine a vertical flight path from a given lateral path.

15. The navigation system according to claim 14, wherein the vertical flight path comprises at least two joined segments with associated glide slopes and wherein said estimated value corresponds to the value of the parameter at the junction of these two segments.

16. An aircraft comprising a navigation system according to claim 1.

17. A command process of a navigation system for an aircraft comprising the following steps:
    calculating an estimated flight path for the aircraft;
    determining an estimated value of a flight parameter that corresponds to an estimated speed, an extension of at least a part of the high-lift devices of the aircraft being performed in view of the estimated value;
    displaying on a display screen a symbol at a position representative of said estimated value,
    wherein the estimated value is a unique value of the flight parameter and the symbol is positioned on the display screen so as to distinctly represent the unique estimated value and show, in advance, a specific time for the extension of the part of the high-lift devices of the aircraft.

18. The command process according to claim 17, wherein the flight parameter is the altitude of the aircraft.

19. The command process according to claim 18, wherein said extension of at least a part of the high-lift devices corresponds to a transition from a fully retracted position to a first intermediate position.

20. The command process according to claim 17, wherein the flight parameter is the speed of the aircraft.

21. The command process according to claim 20, wherein said extension of at least a part of the high-lift devices corresponds to a transition from a first intermediate position to a second intermediate position.

22. The command process according to claim 17, wherein the symbol is displayed at said estimated value on a scale of the parameter displayed on the display screen.

23. The command process according to claim 17, wherein the flight parameter is the position of the aircraft in a horizontal plane.

24. The command process according to claim 23, wherein the symbol is situated at the representative position of said estimated value on a flight plan displayed on the display screen, said flight plan being a projection in a horizontal plane of the estimated flight path.

25. The command process according to claim 17, comprising a step of automatically extending the high-lift devices involved when the actual value of the flight parameter reaches said estimated value.

26. The command process according to claim 17, wherein the calculating of the estimated flight path includes a step of determining a vertical flight path from a given lateral path.

27. An aircraft comprising a device that can implement a process according to claim 17.

28. The navigation system according to claim 1, wherein said means for displaying include means for displaying on said display screen a current position for said aircraft in a horizontal plane and for further displaying a plurality of symbols on said display screen simultaneously with said current position, each of said symbols representing an estimated future position for the aircraft in said horizontal plane, said estimated position corresponding to an anticipated configuration modification for said high-lift devices of said aircraft.

29. The navigation system according to claim 1, wherein said means for displaying include means for displaying on said display screen an altitude scale indicating a current altitude for said aircraft and for displaying said symbol at a position relative to said altitude scale so as to indicate an estimated future altitude for said aircraft corresponding to an anticipated configuration modification for said high-lift devices of said aircraft.

30. The navigation system according to claim 1, wherein said means for displaying include means for displaying on said display screen a speed scale indicating a current speed for said aircraft and for displaying said symbol at a position relative to said speed scale so as to indicate an estimated future speed for said aircraft corresponding to an anticipated configuration modification for said high-lift devices of said aircraft.

31. A navigation system for an aircraft with high-lift devices, comprising:
   means for calculating an estimated flight path for the aircraft;
   means for determining an estimated value of a flight parameter that corresponds, on said estimated flight path, to an estimated speed, an extension of at least a part of the high-lift devices of the aircraft being performed in view of the estimated value; and
   means for displaying an indication of said estimated value.

32. A command process of a navigation system for an aircraft comprising the following steps:
   calculating an estimated flight path for the aircraft;
   determining an estimated value of a flight parameter that corresponds, on said estimated flight path, to an estimated speed, an extension of at least a part of the high-lift devices of the aircraft being performed in view of the estimated value;
   displaying an indication of said estimated value.

33. The navigation system according to claim 31, wherein, the flight parameter is the position of the aircraft in a horizontal plane, and
   a symbol is situated in the representative position of said estimated value on a flight plan displayed on a display screen, said flight plan being a projection in a horizontal plane of the estimated flight path.

34. The command process according to claim 32, wherein, the flight parameter is the position of the aircraft in a horizontal plane, and
   a symbol is situated at the representative position of said estimated value on a flight plan displayed on a display screen, said flight plan being a projection in a horizontal plane of the estimated flight path.

35. The navigation system according to claim 1, wherein the symbol is part of a flight plan displayed on the display screen, said flight plan including data from a current air position of the aircraft to an expected final landing position of the aircraft.

* * * * *